(12) United States Patent
Andrewartha et al.

(10) Patent No.: US 8,808,602 B2
(45) Date of Patent: Aug. 19, 2014

(54) METHOD OF TREATING A NET MADE FROM ULTRA-HIGH-MOLECULAR-WEIGHT POLYETHYLENE

(75) Inventors: Michael Ian Andrewartha, Cornwall (GB); Stephen Lawton, Dorset (GB)

(73) Assignee: Amsafe Bridport Limited, Dorset (GB)

(*) Notice: Subject to any disclaimer, the term of this patent is extended or adjusted under 35 U.S.C. 154(b) by 607 days.

(21) Appl. No.: 13/134,433

(22) Filed: Jul. 12, 2011

(65) Prior Publication Data

US 2014/0203476 A1    Jul. 24, 2014

(30) Foreign Application Priority Data

Mar. 2, 2011 (GB) .................................. 1103625.8

(51) Int. Cl.
*D04H 3/08* (2006.01)

(52) U.S. Cl.
USPC .................. 264/288.4; 264/288.8; 264/290.2; 89/36.02; 89/36.01; 89/36.07

(58) Field of Classification Search
USPC .............. 264/288.4, 208.8, 290.2; 891/36.02, 891/36.01, 36.07
See application file for complete search history.

(56) References Cited

U.S. PATENT DOCUMENTS

2006/0270300 A1   11/2006   Kim et al.
2010/0319524 A1   12/2010   Farinella et al.

FOREIGN PATENT DOCUMENTS

DE   102009051436 A1   5/2011
GB   1443830   * 7/1976
GB   2449055   * 11/2008
WO   WO 2008/079001   * 7/2008

OTHER PUBLICATIONS

GB1103625.8, Search Report, May 1, 2012, 3 pages.

* cited by examiner

*Primary Examiner* — Carol M Koslow
(74) *Attorney, Agent, or Firm* — Kilpatrick Townsend & Stockton LLP; Dean W. Russell

(57) ABSTRACT

A method of treating a net (2) formed from interconnecting strands (4a, 4b) of ultra-high-molecular-weight polyethylene (UHMWPE), the net (2) being formed with knotless intersections (6), comprising the steps of: a) heating the net (2) to a temperature of from 80° to 135° C.; b) applying tension to the net (2); c) reducing the temperature to below 80° C.; and d) removing tension from the net (2).

14 Claims, 2 Drawing Sheets

METHOD OF TREATING A NET MADE FROM ULTRA-HIGH-MOLECULAR-WEIGHT POLYETHYLENE

The present invention relates to a method of treating a net made from ultra-high-molecular-weight-polyethylene (UHMWPE), in particular for providing a net which can be used in protecting an object from attack by a shaped-charge warhead, such as a rocket propelled grenade (RPG).

Shaped-charge warheads, such as RPGs are capable of penetrating steel and armour and, therefore, pose a particular problem for tanks and armoured personnel carriers (APC) in combat situations. A RPG consists of a cone shaped warhead having a quantity of explosive disposed behind a hollow space. The hollow space is typically lined with a compliant material, such as copper. When detonated the energy is concentrated to the centre of the charge and it is sufficient to transform the copper into a thin, effectively liquid, shaped-charge jet having a tip speed of 12 $kms^{-1}$ or greater. Although the copper is described as "effectively liquid", X-ray diffraction has shown the metal actually stays solid. The extremely high pressures generated cause the target material to yield and flow plastically, with devastating effect. To be most effective the RPG has to detonate at the correct distance from the target. If it detonates too close to the target the shaped-charge jet will not have properly formed before hitting the surface and the effect will be lessened. Conversely, if the RPG is detonated too far away from the target surface the shaped-charge jet will have diffused and, again, the effect is lessened.

The fact that RPGs can be detonated at a particular distance from the target object has been commonly utilised in defence shields. By providing a preliminary shield at a short distance from the actual armour of the vehicle, or other structure, it is possible to cause the warhead to detonate at a safe distance from the actual armour, with the effect that the charge explodes between the preliminary shield and the armour. In effect, the warhead becomes a conventional grenade, rather than a shaped-charge.

In recent times it has become common to fit so-called "slat armour" to tanks and other military vehicles. The slat armour comprises a metal frame which is mounted at a distance of approximately 300-500 mm from the vehicle. The frame comprises a plurality of horizontal struts or slats which are spaced apart at a distance selected to prevent penetration by shaped-charge warheads. The slat armour functions as a preliminary shield, causing the premature detonation of shaped-charge warheads or, if caught between slats, disabling the shaped-charge. Slat armour has been used by both the British Army, on the Warrior APC and the American Army, on the Stryker APC. One disadvantage of the slat armour is that it is relatively heavy and adds a great deal of weight to the already very heavy vehicle.

It is known from GB 2 449 055 A and WO 2008/079001 A1 to use a net for protecting objects against RPGs. GB 2 449 055 A (the disclosure of which is incorporated herein by reference), which is in the name of the present applicant, discloses the use of nets formed from strands of ultra-high-molecular-weight polyethylene (UHMWPE), e.g. Dyneema®, deployed at a distance of 500 mm from the target object to act as a defensive shield against RPGs. The net is generally mounted in a frame to maintain it in an open condition and the frame may be attached to the object it is protecting, e.g. a vehicle, or the frame may be arranged in front of the object it is protecting. WO 2008/079001 A1 discloses a netting of knotted and coated superstrong fibres, e.g. Dyneema®, which is disposed in front of the object to be protected in such a manner that the nose cone of a RPG caught in the netting will penetrate one of the meshes of the netting and be deformed through strangulation, thereby disabling the detonator. The netting is preferably pre-stretched after being knotted, preferably after being coated, with a tension of about 0.2 to 0.5 times the breaking stress of the knots. This is said to minimise slip of the knots during strangulation of the RPG.

As described above, the primary damage inflicted by a RPG is not caused by the explosion itself but by the shaped-charge jet which is generated. The nets function to deform the nose cone of the RPG, thus preventing the shaped-charge jet from forming properly. One of the key advantages of net-based systems over conventional slat armour is that they offer significant reduction in weight.

When a net is deployed in the path of a RPG the nose cone of the RPG will normally be received in a net mesh of the net. The nose cone is typically made from aluminum and the circumference of the net mesh will be selected such that it is smaller than the maximum circumference of the nose cone, such that the RPG cannot pass straight through the net. The most widely used RPG, the RPG-7, propels a warhead with a diameter of 85 mm, and most other currently available RPGs propel warheads with diameters in the range from 60 mm to 90 mm. It is therefore possible to construct a net which is capable of disabling more than one size of warhead, but it may be preferable that the net is selected to counteract the specific threat, i.e. an RPG-7 specific textile armour.

As the nose cone enters the net the mesh begins to tighten against the nose cone as it passes through, causing the net to strangulate the nose cone. As mentioned above, the nose cone is hollow and the strangulation causes the nose cone to deform and crumple, which in turn causes the firing mechanism to fail and prevents the shaped-charge jet from forming. Once the nose cone has been strangulated the remainder of the RPG acts on the net mesh and will typically cause the mesh to break. However, the damage caused by the body of the RPG will only be that of a conventional high speed explosive, which is not comparable to the potential damage caused by a shaped-charge. In most cases it will be necessary to repair or replace the textile armour after it has been hit. This is also the case in respect of the currently available slat armour.

It is an object of the present invention to provide an improvement, or at least an alternative, to the currently available nets for use in defending against RPGs.

According to a first aspect of the present invention there is provided a method of treating a net formed from interconnecting strands of ultra-high-molecular-weight polyethylene (UHMWPE), the net being formed with knotless intersections, comprising the steps of: a) heating the net to a temperature of from 80° to 135° C.; b) applying tension to the net; c) reducing the temperature to below 80° C.; and d) removing tension from the net.

As noted above, it is known to use nets made from UHMWPE, such as Dyneema®, to protect objects from attack by RPGs. However, it is not known to subject a knotless UHMWPE net to the present method of treatment. The term "knotless", as used herein, refers to a net in which the majority of the intersections are formed using a knotless construction as described in GB 1 443 830 A (the disclosure of which is incorporated herein by reference). In a "knotless" construction the net intersections are formed by providing a hole or slit in each of the net braids at the intersection and threading the body of each of the net braids through the hole or slit in the other one. This construction permits the net braids to slide with respect to one another in the region of the intersections. The intersections are not fixed to the same degree as they are in knotted nets.

The treatment according to the present invention is a form of heat treating which imparts certain desirable properties to the net which were not previously available in the prior art nets.

The "heat treating" process according to the present invention is similar to the heat setting treatment used in, for example, nylon nets. Knotted nylon nets, such as sports nets and fishing nets, are heat set to "lock" the net knots and prevent them from slipping. This also stops the nets from fraying and minimises dust and water penetration. The present heat treating process does not lock the knotless intersections. The application of heat while the net is under tension causes the individual fibres in the net braids to straighten out and align axially along the direction of the load. This thins the net braid and causes it to take a rounded profile rather than the standard flat profile, and it also reduces the overall diameter of the braid by compressing the fibres. This is desirable as it presents a smaller surface area of the net mesh which can be hit by a RPG. The process also increases the strength of the net compared to untreated UHMWPE, and forms hard, stiff net braids. The surface of the net braids is best described as being "slippy", in that they are able to move freely with respect to one another when they contact and they are pushed to the side when hit by a projectile, such as a RPG, rather than causing it to detonate.

The round, hard braid with its slippy surface causes a RPG to "roll off" or "slide off" the braid when it impacts the braid. This prevents the fuse from detonating and causes the RPG to enter a net mesh and be disabled as described.

Furthemore, rather than becoming locked, as a knotted intersection does, the knotless intersections become loose as the net braids are able to move freely with respect to one another. The result of this is that a RPG will also "roll off" the net braids at the knotless intersections. It is believed that the RPG fuse will only be triggered if the RPG impacts the intersection at 90° to the net intersection. At any other angle of impact it is believed that the loose intersection permits the RPG to roll off and pass into the net mesh.

GB 2 449 055 A discloses a knotless net made from Dyneema® net strands. However, GB 2 449 055 A discloses no treatment for the net and specifies that the net fibres should be "soft and fluffy" and not have a "hard" or "resilient" surface. This is in direct contrast to the present invention in which the treatment forms a round, hard braid. The present inventors made the surprising discovery that rather than triggering a RPG fuse a UHMWPE net treated according to the present invention actually improves the effectiveness of the net by causing an impacting RPG to "roll off" or slide past a treated net braid.

WO 2008/079001 specifically discloses a knotted net made from Dyneema® net strands and does not disclose subjecting the net to elevated temperatures. The present inventors have identified that knotted nets are less desirable as the knots form hard points which can cause impacting RPGs to detonate. Although this is still preferable to having the RPG detonate on the object which the net is protecting it is less advantageous than the present invention in which the heat set knotless intersections actually reduce RPG detonation by effectively guiding the RPG into a mesh of the net.

In an embodiment of the invention the tension is applied in a direction perpendicular to the longitudinal axis of the net strands. The net strands or braids all run in the same direction and their longitudinal axes are generally parallel to one another, as can be seen in FIG. 1. It is within the scope of the present invention to apply tension in a direction parallel to the longitudinal axis, but the present inventors believe that the best results are achieved by applying tension in a direction perpendicular to the longitudinal axis of the net strands.

In an embodiment of the invention the net is heated to a temperature of from 80° C. or 85° C. or 90° C. or 95° C. or 100° C. or 105° C. or 110° C. or 115° C. or 120° C. or 125° C. or 130° C. In an embodiment of the invention the net is heated to a temperature of up to 85° C. or 90° C. or 95° C. or 100° C. or 105° C. or 110° C. or 115° C. or 120° C. or 125° C. or 130° C. or 135° C.

In an embodiment of the invention the net is heated for a period of at least 5 minutes. In a further embodiment of the invention the net is heated for a period of at least 10 minutes. In a yet further embodiment of the invention the net is heated for a period of 11±1 minutes.

In an embodiment of the invention the tension is applied to the net in a constant manner. In an embodiment of the invention the tension applied to the net is from 5%-100% of the total strength of the net. In an embodiment of the invention the tension applied to the net is from 5% or 10% or 15% or 20% or 25% or 30% or 35% or 40% or 45% or 50% or 55% or 60% or 65% or 70% or 75% or 80% or 85% or 90% or 95% of the total strength of the net. In an embodiment of the invention the tension applied to the net is up to 10% or 15% or 20% or 25% or 30% or 35% or 40% or 45% or 50% or 55% or 60% or 65% or 70% or 75% or 80% or 85% or 90% or 95% or 100% of the total strength of the net.

In embodiments of the invention the tension is maintained until the temperature drops below 70° C., or below 60° C., or below 50° C.

In an embodiment of the invention the net is pre-treated with a bonding solution.

The present invention will now be described, purely by way of example, with reference to the accompanying drawings, in which.

Figure 1:
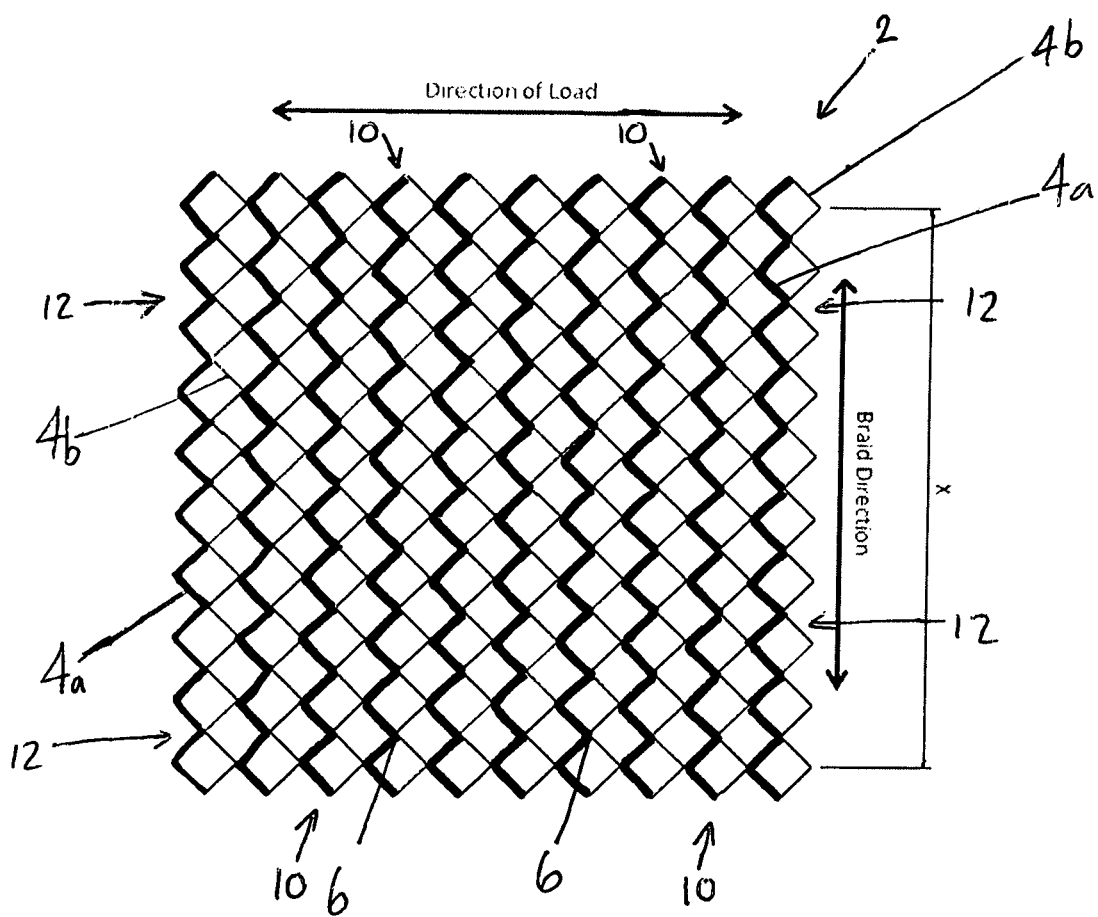
FIG. 1 shows a section of net mesh according to the present invention.
Figure 2:
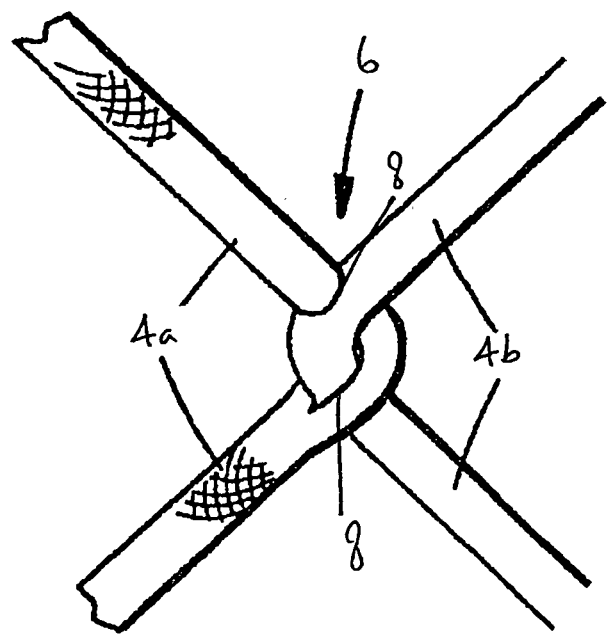
FIG. 2 shows a knotless intersection according to the present invention.

Referring firstly to FIG. 1 this shows a section of net 2 in which a plurality of net strands 4a,b of Dyneema® SK90 braid manufactured by DSM are interconnected to define the net 2. Although the net 2 is formed from Dyneema® SK90 it could be formed from any suitable UHMWPE, such as Dyneema® SK75 or Spectra®, manufactured by Honeywell. The net strands 4a,b run from top to bottom as shown in FIG. 1 and the points of intersection 6 comprise knotless intersections 6, as known from GB 1 443 830 and as illustrated in FIG. 2. The net strands 4a,b are all made from the same material, but alternating net strands 4 are illustrated with thick 4a and thin 4b lines purely to aid understanding. As can be best seen in FIG. 2, the knotless intersections 6 are formed by providing holes or slits 8 through the body of each of the net strands 4a,b and threading the body of the net strands 4a,b through the hole or slit 8 in the other one of them. The free ends 10 of the net strands 4a,b are back spliced into an adjacent net strand 4, as is well known in the art of net making.

In one particular embodiment of the invention the method is performed as follows:
1. Pre-treatment—The net 2 is pre-treated with a bonding solution. The procedure for coating the net 2 is to fully immerse the net in the bonding solution according to the manufacturer's instructions. The net 2 is then removed from the solution and fully dried before continuing to the next stage. This improves the UV resistance, waterproof characteristics and abrasion resistance of the net strands 4.
2. The net 2 is transferred to a heat treatment apparatus. Each side 12 of the net 2 is mounted on steel rods which engage with the net meshes along the side 12 of the net 2 such that tension, which is exerted by applying a pulling load to the steel rods, is applied in a direction perpendicular to the longitudinal axis of the net strands 4—as shown by the arrow in FIG. 1.

3. The apparatus is closed such that the net 2 is enclosed within a chamber and an electric heater is activated and the temperature brought up to 100° C.
4. Once the temperature reaches 100° C. the apparatus is controlled to maintain the temperature at this level and tension is applied to the net 2 by activating a mechanism to pull the steel rods in a direction perpendicular to the longitudinal axis of the net strands 4. The tension is applied in a constant manner in accordance with the values set out in Table 1.
5. The tension and temperature are maintained for a period of 11±1 minutes.
6. The heater is deactivated and the net 2 is cooled while maintaining the tension.
7. Once the temperature has fallen below 50° C. the tension is removed and the net can be removed from the apparatus.

As can be seen from Table 1, the tension applied to the net 2 depends on the total number of meshes in the net 2. Table 1 shows a list of values from 10 meshes to 55 meshes, but it will be clear that more or less meshes may be used in a net 2 and the tensile load adjusted accordingly. Table 1 contains values for nets 2 having a distance between knotless intersections (K-K distance) of 35 mm and 40 mm, but it will be clear that the present method could equally be applied to nets 2 having different K-K values. The key constraint on the K-K values is that the net mesh must not be so large as to permit a RPG to pass through. The K-K distance is the distance between knotless intersections when the net 2 is in an untensioned state.

The circumference of each individual mesh section of the net 2 must be less than the maximum circumference of the RPG warhead. It is preferred that the circumference of each individual mesh section is less than, or equal to, two-thirds of the maximum circumference of the RPG warhead. This has been found to be the optimum mesh size which allows for as open a net 2 as possible, while ensuring that the net 2 is capable of strangulating the nose cone of an RPG warhead. It is believed that if the circumference of the mesh section is greater than two-thirds of the maximum circumference of the RPG warhead, then the possibility exists that the warhead will pass through the net 2 and impact with the target object. It is also desirable to have as open a net 2 as possible in order to minimise the likelihood of the warhead impacting with the net strands. Consequently, it has been discovered that the optimum circumference of each mesh section is two-thirds of the maximum circumference of the nose cone of the RPG which the net 2 is designed to disable.

TABLE 1

| No of Meshes | Dimension 'X' from FIG. 2 for nets with a 35 mm K-K (mm) | Dimesion 'X' from FIG. 2 for nets with a 40 mm K-K (mm) | Tensile Load to be used (metric tonnes) |
|---|---|---|---|
| 10 | 353 | 405 | 4.7 |
| 11 | 393 | 450 | 5.2 |
| 12 | 432 | 495 | 5.7 |
| 13 | 471 | 540 | 6.1 |
| 14 | 510 | 585 | 6.6 |
| 15 | 550 | 630 | 7.1 |
| 16 | 589 | 675 | 7.5 |
| 17 | 628 | 720 | 8.0 |
| 18 | 667 | 765 | 8.5 |
| 19 | 707 | 810 | 9.0 |
| 20 | 746 | 855 | 9.4 |
| 21 | 785 | 900 | 9.9 |
| 22 | 824 | 945 | 10.4 |
| 23 | 864 | 990 | 10.8 |
| 24 | 903 | 1035 | 11.3 |
| 25 | 942 | 1080 | 11.8 |
| 26 | 981 | 1125 | 12.3 |
| 27 | 1021 | 1170 | 12.7 |
| 28 | 1060 | 1215 | 13.2 |
| 29 | 1099 | 1260 | 13.7 |
| 30 | 1138 | 1305 | 14.1 |
| 31 | 1178 | 1350 | 14.6 |
| 32 | 1217 | 1395 | 15.1 |
| 33 | 1256 | 1440 | 15.6 |
| 34 | 1295 | 1485 | 16.0 |
| 35 | 1335 | 1530 | 16.5 |
| 36 | 1374 | 1575 | 17.0 |
| 37 | 1413 | 1620 | 17.4 |
| 38 | 1452 | 1665 | 17.9 |
| 39 | 1492 | 1710 | 18.4 |
| 40 | 1531 | 1755 | 18.9 |
| 41 | 1570 | 1800 | 19.3 |
| 42 | 1609 | 1845 | 19.8 |
| 43 | 1649 | 1890 | 20.3 |
| 44 | 1688 | 1935 | 20.7 |
| 45 | 1727 | 1980 | 21.2 |
| 46 | 1766 | 2025 | 21.7 |
| 47 | 1806 | 2070 | 22.2 |
| 48 | 1845 | 2115 | 22.6 |
| 49 | 1884 | 2160 | 23.1 |
| 50 | 1923 | 2205 | 23.6 |
| 51 | 1963 | 2250 | 24.0 |
| 52 | 2002 | 2295 | 24.5 |
| 53 | 2041 | 2340 | 25.0 |
| 54 | 2080 | 2385 | 25.5 |
| 55 | 2120 | 2430 | 25.9 |

Once the method of treatment has been applied to the net 2 the mesh size will have increased by approximately 5%. By applying tension and heat in this manner the increase in mesh size will be maintained during the life of the net 2, along with the other properties described above. The treated net 2 will have a more rounded braid than an untreated net and it will be stronger and have a harder finish.

Once the net 2 has been subjected to the treatment described above it is mounted within a frame structure for operational use. It has been shown that the net does not require support to function, as in the time-frame the RPG acts on the net the forces are not transmitted to the frame, but it is preferred from an operational point of view. The nets 2 may be used to protect a variety of targets, but it is particularly envisaged that the nets 2 will be fitted to armoured personnel carriers (APC) and the like in a similar manner to conventional slat armour. Although the frame need not provide support for the net 2 in disabling RPGs, it must be strong enough to handle the daily wear and tear to which it will be subjected. For example, when it is fitted to an APC it is likely that the frame will be utilised by soldiers to enable them to climb on top of the APC. In order to improve the functionality of the net 2 it can be provided with a camouflage colouring. The use of such camouflage is well known. Testing has shown that treated nets 2 according to the present invention perform better than untreated nets made from the same material and construction. It is believed that this is due to the fact that, contrary to previous beliefs, a net 2 with a hard finish is actually more effective at deflecting direct hits from RPGs than a soft net.

The invention claimed is:

1. A method of treating a net formed from interconnecting strands of ultra-high-molecular-weight polyethylene (UHMWPE), the net being formed with knotless intersections, comprising the steps of:
   a) heating the net to a temperature of from 80° to 135° C.;
   b) applying tension to the net;
   c) reducing the temperature to below 80° C.; and
   d) removing tension from the net.

2. The method of claim 1, wherein the tension is applied in a direction perpendicular to the longitudinal axis of the net strands.

3. The method of claim 1, wherein the net is heated to a temperature of from 90° C. to 125° C.

4. The method of claim 3, wherein the net is heated to a temperature of from 95° C. to 105° C.

5. The method of claim 1, wherein the net is heated for a period of at least 5 minutes.

6. The method of claim 5, wherein the net is heated for a period of at least 10 minutes.

7. The method of claim 1, wherein the tension is applied to the net in a constant manner.

8. The method of claim 7, wherein the tension applied to the net is from 5%-50% of the total strength of the net.

9. The method of claim 8, wherein the tension applied to the net is from 10%-45% of the total strength of the net.

10. The method of claim 9, wherein the tension applied to the net is from 30%-45% of the total strength of the net.

11. The method of claim 1, wherein the tension is maintained until the temperature drops below 50° C.

12. The method of claim 1, wherein the net is pre-treated with a bonding solution.

13. A method of treating a net formed from interconnecting strands of ultra-high-molecular-weight polyethylene (UHMWPE), the net being formed with knotless intersections, comprising the steps of;
   a) pre-treating the net with a bonding solution;
   b) heating the net to a temperature of approximately 100° C.;
   c) applying tension to the net in a direction perpendicular to the longitudinal axis of the net strands;
   d) maintaining the temperature and tension for a period of approximately 11 minutes;
   e) reducing the temperature to below 50° C.; and
   f) removing the tension from the net.

14. A knotless net formed from interconnecting strands of UHMWPE, wherein the net has been subjected to the following treatment before use:
   a) heating the net to a temperature of from 80° to 135° C.;
   b) applying tension to the net;
   c) reducing the temperature to below 80° C.; and
   d) removing tension from the net.

* * * * *